(12) United States Patent
Jones et al.

(10) Patent No.: US 9,145,988 B2
(45) Date of Patent: Sep. 29, 2015

(54) BRAZING RING

(75) Inventors: Jeffrey L. Jones, Indianapolis, IN (US);
Luis Felipe Avila, Manlius, NY (US);
Loren D. Hoffman, Jamestown, IN (US); Jason Michael Thomas, Avon, IN (US); Eric Konkle, Plainfield, IN (US);
Timothy Andrecheck, Chittenango, NY (US)

(73) Assignee: CARRIER CORPORATION, Farmington, CT (US)

( * ) Notice: Subject to any disclaimer, the term of this patent is extended or adjusted under 35 U.S.C. 154(b) by 0 days.

(21) Appl. No.: 13/984,163

(22) PCT Filed: Feb. 6, 2012

(86) PCT No.: PCT/US2012/023947
§ 371 (c)(1),
(2), (4) Date: Aug. 7, 2013

(87) PCT Pub. No.: WO2012/109132
PCT Pub. Date: Aug. 16, 2012

(65) Prior Publication Data
US 2013/0313822 A1    Nov. 28, 2013

Related U.S. Application Data

(60) Provisional application No. 61/475,460, filed on Apr. 14, 2011, provisional application No. 61/440,194, filed on Feb. 7, 2011.

(51) Int. Cl.
*F16L 13/08* (2006.01)
*B23K 1/00* (2006.01)
*B23K 1/19* (2006.01)
(Continued)

(52) U.S. Cl.
CPC ............... *F16L 13/08* (2013.01); *B23K 1/0012* (2013.01); *B23K 1/19* (2013.01); *B23K 1/203* (2013.01); *B23K 35/0222* (2013.01); *B23K 35/288* (2013.01); *C22C 21/10* (2013.01); *F28F 9/26* (2013.01); *F28F 21/089* (2013.01); *B23K 2201/14* (2013.01); *B23K 2203/10* (2013.01)

(58) Field of Classification Search
USPC .......................................... 285/288.11, 289.5
See application file for complete search history.

(56) References Cited

U.S. PATENT DOCUMENTS

| | | | | |
|---|---|---|---|---|
| 400,869 | A | * | 4/1889 | Norton et al. ................ 428/34.1 |
| 1,629,748 | A | * | 5/1927 | Stoody ........................... 428/397 |

(Continued)

FOREIGN PATENT DOCUMENTS

EP    2327504 A1    6/2011

OTHER PUBLICATIONS

IPRP and Written Opinion issued in PCT/US2012/023947 on Aug. 13, 2013, pp. 1-8.

(Continued)

*Primary Examiner* — David E Bochna
(74) *Attorney, Agent, or Firm* — Cantor Colburn LLP

(57) ABSTRACT

A brazing ring is provided and includes ring material including an aluminum-zinc-silicon alloy having a first melting point and flux material contained within the ring material having a second melting point, which is substantially lower than the first melting point, the ring material being formed such that the flux material is exposed outwardly to a heat source and such that, upon heating, flux material melts before the ring material.

11 Claims, 2 Drawing Sheets

(51) Int. Cl.
  *B23K 1/20*  (2006.01)
  *B23K 35/02* (2006.01)
  *B23K 35/28* (2006.01)
  *C22C 21/10* (2006.01)
  *F28F 9/26*  (2006.01)
  *F28F 21/08* (2006.01)

(56) References Cited

U.S. PATENT DOCUMENTS

| | | | | |
|---|---|---|---|---|
| 1,937,239 | A | * | 11/1933 | McWane .................. 285/288.11 |
| 2,055,276 | A | * | 9/1936 | Brownsdon et al. ....... 285/289.5 |
| 2,565,477 | A | * | 8/1951 | Crowell et al. .............. 228/56.3 |
| 2,753,428 | A | * | 7/1956 | Graham ................... 285/288.11 |
| 3,170,228 | A | | 2/1965 | Rich |
| 3,542,998 | A | * | 11/1970 | De Huff .................. 219/146.52 |
| 3,605,255 | A | | 9/1971 | Metzger et al. |
| 3,935,414 | A | * | 1/1976 | Ballass et al. .................. 219/61 |
| 4,861,681 | A | | 8/1989 | Asano et al. |
| 5,098,006 | A | | 3/1992 | McManus |
| 5,125,555 | A | | 6/1992 | Grisoni et al. |
| 5,195,673 | A | | 3/1993 | Irish et al. |
| 5,462,216 | A | | 10/1995 | Nishimura |
| 5,549,238 | A | | 8/1996 | Hindle |
| 6,164,904 | A | | 12/2000 | Abriles et al. |
| 6,264,062 | B1 | | 7/2001 | Lack et al. |
| 6,422,451 | B2 | | 7/2002 | Bendall et al. |
| 6,502,420 | B2 | | 1/2003 | Gupte |
| 6,605,370 | B2 | | 8/2003 | Van Rijkom et al. |
| 6,691,908 | B2 | | 2/2004 | Ishida et al. |
| 6,781,084 | B2 | | 8/2004 | Brockman et al. |
| 6,871,771 | B2 | | 3/2005 | Tonjes et al. |
| 7,219,827 | B2 | | 5/2007 | Breznak et al. |
| 7,293,689 | B2 | | 11/2007 | Mayers |
| 7,414,226 | B2 | | 8/2008 | Wang et al. |
| 7,624,906 | B2 | | 12/2009 | Yan et al. |
| 7,858,204 | B2 | * | 12/2010 | Campbell et al. ............. 428/626 |
| 7,963,626 | B2 | | 6/2011 | Umeda |
| 8,274,014 | B2 | * | 9/2012 | Campbell et al. .......... 219/145.1 |
| 2008/0135134 | A1 | | 6/2008 | Kim |
| 2008/0296005 | A1 | | 12/2008 | Taras et al. |
| 2009/0200363 | A1 | * | 8/2009 | Means et al. ................. 228/56.3 |
| 2010/0096436 | A1 | | 4/2010 | Nangle et al. |
| 2010/0139094 | A1 | | 6/2010 | Branyon et al. |
| 2010/0170669 | A1 | | 7/2010 | Jaworowski |
| 2010/0176106 | A1 | | 7/2010 | Christensen et al. |

OTHER PUBLICATIONS

International Search Report issued in corresponding application No. PCT/US12/023947 filed Feb. 6, 2012 mail date Jul. 6, 2012, pp. 1-5.
Written Opinion issued in corresponding application No. PCT/US12/023947 filed Feb. 6, 2012; mail date Jul. 6, 2012, pp. 1-8.

* cited by examiner

BRAZING RING

CROSS REFERENCE TO RELATED APPLICATION

This application is a National Stage Application of PCT Application No. PCT/US12/23947 filed Feb. 6, 2012, which is a PCT Application of U.S. Provisional Patent Application Nos. 61/440,194 filed Feb. 7, 2011 and 61/475,460 filed Apr. 14, 2011, the disclosures of which are incorporated by reference herein in their entireties.

BACKGROUND OF THE INVENTION

The subject matter disclosed herein relates to an autobrazing system and, more particularly, to an autobrazing system having a brazing ring.

Round tube and plate fin heat exchangers (RTPF) used in air conditioners and heat pumps generally include a series of long "U"-shaped tubes inserted into a densely arranged pack of fins. The formed tubes, called hairpins, are then circuited (joined) to each other at the opposite end by brazed-in-place return bends. At low production volumes, the tubes are brazed manually. However, such manual brazing process is operator dependant, susceptible to a higher defect rate and unacceptable in the high volume production environments. Therefore, there is cost justification to automate the brazing process when the production rates become sufficiently high.

Since conventional RTPF heat exchangers typically have copper tubes and aluminum fins, the associated brazing process is forgiving due to a wide temperature window between melting points of brazing material and copper tubes. Brazing automation for aluminum tubes and aluminum fins, on the other hand, is new and requires relatively high quality and high precision brazing to assure a leak/defect rate that is comparable to copper/aluminum RTPFs.

BRIEF DESCRIPTION OF THE INVENTION

According to one aspect of the invention, a brazing ring is provided and includes ring material including an aluminum-zinc-silicon alloy having a first melting point and flux material contained within the ring material having a second melting point, which is lower than the first melting point, the ring material being formed such that the flux material is exposed to a heat source and such that, upon heating, flux material melts before the ring material.

According to another aspect of the invention, an autobrazing system is provided and includes first and second tubular members telescopically fittable to define first and second annular spaces and a brazing ring fittable into the second annular space and including ring material including an aluminum-zinc-silicon alloy having a first melting point and flux material contained within the ring material and having a second melting point, which is lower than the first melting point, the ring material being formed such that the flux material is exposed to a heat source and such that, upon heating, flux material melts before the ring material melts.

According to yet another aspect of the invention, an autobrazing system is provided and includes a first aluminum tubular member having a tubular portion and a flared portion at an end thereof, a second aluminum tubular member telescopically fittable into the flared and tubular portions to define first and second annular spaces and a brazing ring fittable into the second annular space and including ring material including an aluminum-zinc-silicon alloy having a first melting point and flux material contained within the ring material and having a second melting point, which is lower than the first melting point, the ring material being formed such that the flux material is exposed to a heat source and such that, upon heating, flux material melts before the ring material.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
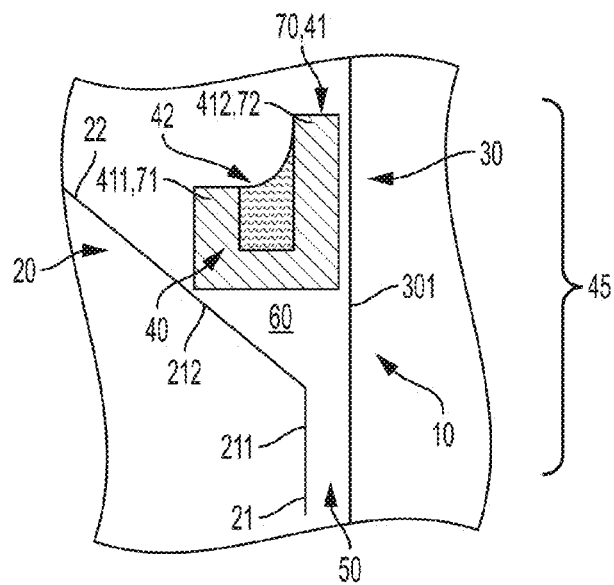
FIG. 1 is a cross-section view of an autobrazing system with a brazing ring in accordance with embodiments.

With reference to FIG. 1, an autobrazing system 10 is provided and includes a first tubular member 20, a second tubular member 30 and a brazing ring 40. The first tubular member 20 may be an end of a U-shaped tube disposed within a round tube plate fin (RTPF) heat exchanger and has a tubular portion 21 and a flared portion 22. The tubular portion 21 is substantially cylindrical with a substantially uniform diameter. The flared portion 22 flares outwardly from an end of the tubular portion 21 and has an increasing diameter along a length thereof. In some configurations, the flared portion 22 will be elevated above the tubular portion 21. The second tubular member 30 may be an end portion of a return bend tube by which adjacent U-shaped tubes of an RTPF heat exchanger fluidly communicate. The second tubular member 30 is telescopically fittable into the flared portion 22 and the tubular portion 21 of the first tubular member 20 to form a joint 45.

The first tubular member 20 further includes a first interior facing surface 211 at the tubular portion 21 and a second interior facing surface 212 at the flared portion 22. Similarly, the second tubular member 30 further includes an exterior facing surface 301. Thus, with this configuration described above, the telescopic fitting of the second tubular member 30 in the first tubular member 20 defines first and second annular spaces 50 and 60, respectively. The first annular space 50 is defined between the first interior facing surface 211 and the exterior facing surface 301 at the tubular portion 21 of the first tubular member 20. The second annular space 60 is defined between the second interior facing surface 212 and the exterior facing surface 301 at the flared portion 22 of the first tubular member 20. As noted above, in some configurations, the second annular space 60 will be elevated above the first annular space 50.

In some embodiments, the first and second tubular members 20 and 30 may be formed of aluminum and/or aluminum alloys such that brazing processes should be carried out within narrow temperature/time ranges to ensure high quality and high precision brazing.

The brazing ring 40 is fittable into the second annular space 60 such that it may be suspended above the first annular space 50. The brazing ring 40 includes ring material 41 and flux material 42, which is contained within the ring material 41. During brazing processes, the flux material 42 cleans oxides off of the first and second interior facing surfaces 211 and 212 and off of the exterior facing surface 301 to thereby facilitate performance of high quality and high precision brazing processes.

The ring material 41 may include, for example, aluminum-zinc-silicon (AlZiSi). In accordance with exemplary embodiments, the ring material 41 may include about 72%±7% (68-76%) aluminum, about 20%±7% (16-24%) zinc and about (4-12%) 8%±7% silicon, the flux material 42 may have a minimum weight of about 0.08 grams and a maximum weight of about 0.25 grams (a weight of between 0.3 and 0.6 grams) while the ring material 41 may have a minimum weight of about 0.348 grams and a maximum weight of about 0.6 grams (a weight of between 0.08 and 0.25 grams). A ratio of ring material 41 to flux material 42 may be about 70-85% to 15-30% or, more particularly, about 71-81% to about 19-29%. The use of the aluminum-zinc-silicon alloy assures a significant separation between the melting point of the flux material 42 and the ring material 41 so that the flux material 42 will tend to melt before the ring material 41. This is particularly suitable in Aluminum-Aluminum brazing where the brazing temperature range is relatively narrow and the respective melting points of the ring material 41 and the flux material 42 are provided at opposite ends of the range.

The flux material 42 may be generally difficult to form into given particular shapes, such as an annular ring. Moreover, once the flux material 42 is formed into those shapes, the shapes tend to break down or otherwise fail during shipping, handling and/or brazing process preparations. The ring material 41 serves to contain the flux material 42 in the given particular shapes such that break downs and/or failures are avoided. For example, where the flux material 42 is to be formed into an annular ring, the ring material 41 may be formed into an annular groove surrounding the ring.

The ring material 41 has at least a first part 411 and a second part 412. The second part 412 may be substantially larger than the first part 411. The ring material 41 is formed in an annular shape such that the flux material 42 is contained within an annular space within the ring material 41 and exposed outwardly. The flux material 42 is thus more exposed to a heat source than the ring material 41 and the first part 411 is more exposed to the heat source than the second part 412. Combined with the fact that the melting point of the flux material 42 is lower than that of the ring material 41 it is to be understood that, upon heating, the flux material 42 melts prior to any ring material 41 melting. Thus, molten flux material 42 flows into the first annular space 50 ahead of any molten ring material 41.

The molten flux material 42 flows into the first annular space 50 by capillarity. Thus, a flow speed of the molten flux material 42 is maintained at a relatively slow pace to encourage appropriate cleaning and brazing processes. In some embodiments, molten ring material 41 is substantially prevented from flowing into the first annular space 50.

Where an amount of molten ring material 41 enters the first annular space 50 along with or ahead of the molten flux material 42, the amount may be limited to that of the first part 411, which is more exposed to the heat source than the second part 412. Thus, the amount of flowing molten ring material 41 may be small as compared to an amount of the flux material 42 entering the first annular space 50 due to the first part 411 being substantially smaller than the second part 412, which is shielded from the heat source and remains solid during much of the brazing process. As such, the first and second interior facing surfaces 211 and 212 and the exterior facing surface 301 are properly and efficiently cleaned by the flux material 42.

As shown in FIG. 1, the ring material 41 is formed with a J-shaped cross section 70 whereby the flux material 42 is contained within the annular recess formed between the short leg 71 and the long leg 72. In this case, the short leg 71 is proximate to the second interior facing surface 212, forms the first part 411 and may be substantially thinner than the long leg 72. Upon heating, therefore, the short leg 71 will either not melt until at least all of the flux material 42 has melted or may tend to partially melt such that only a small amount of molten ring material 41 will flow into the first annular space 50.

Figures 2, 3:
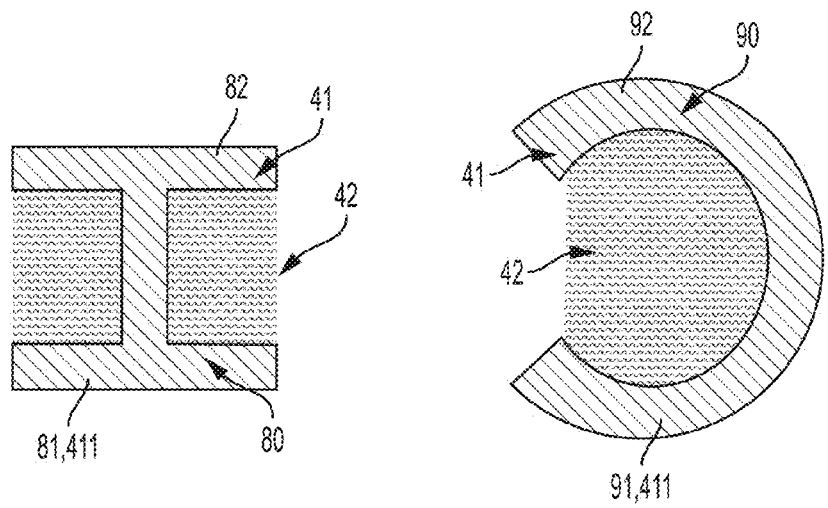
FIG. 2 is a cross-sectional view of the brazing ring in accordance with alternative embodiments.
FIG. 3 is a cross-sectional view of the brazing ring in accordance with further alternative embodiments.
Figure 4:
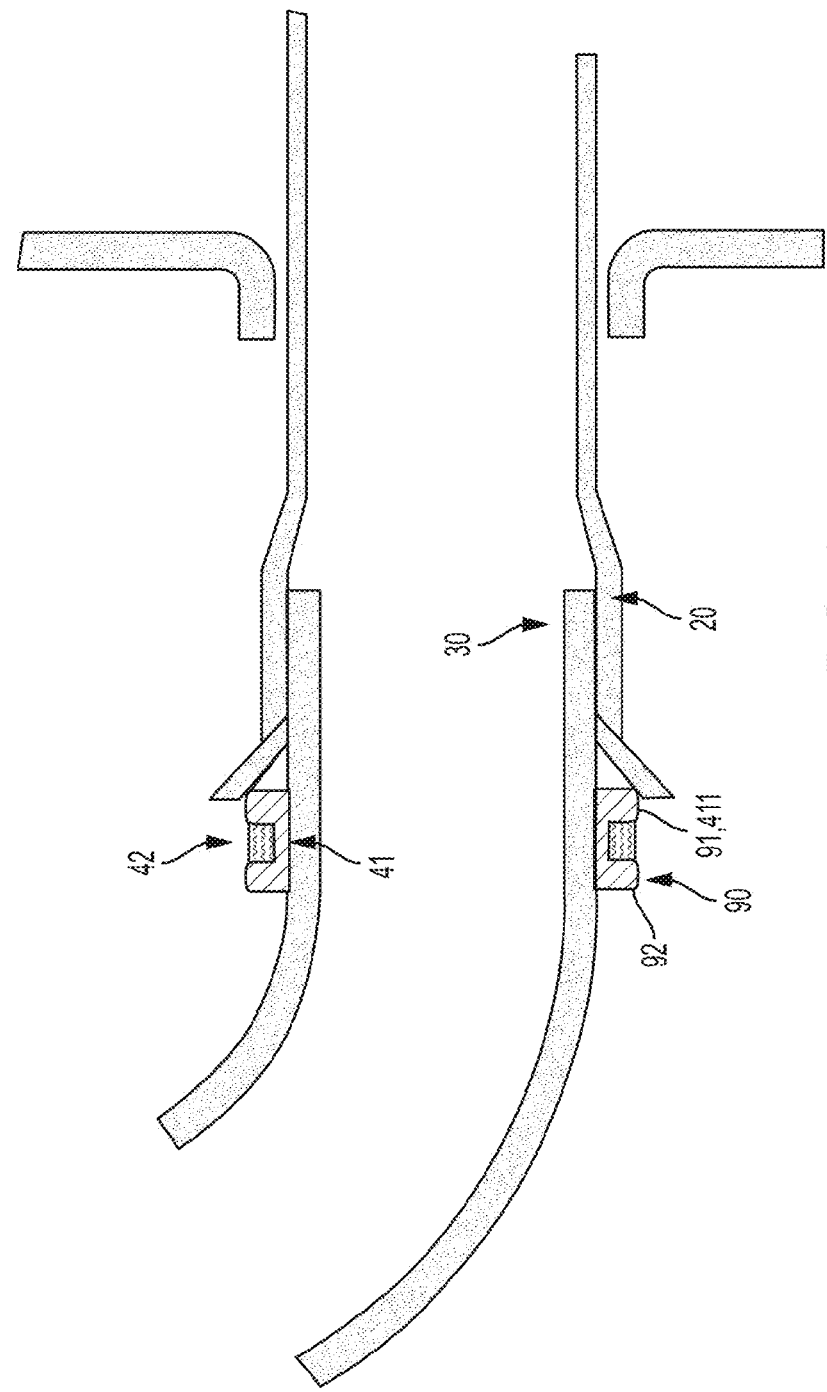
FIG. 4 is a cross-sectional view of the brazing ring in accordance with still further alternative embodiments.

With reference to FIGS. 2-4, further alternative embodiments of the brazing ring 40 are provided. In one alternative embodiment, as shown in FIG. 2, the ring material 41 may be formed with an I-shaped cross-section 80 whereby the flux material 42 is contained within the annular pockets on either side of the vertical portion of the I-shape. In this case, part 81 is proximate to the second interior facing surface 212, forms the first part 411 and may be substantially thinner than part 82.

In other alternative embodiments, as shown in FIGS. 3 and 4, the ring material 41 may be formed with an inverted C-shaped cross-section 90 whereby the flux material 42 is contained within the annular pockets in the center of the C-shape. In this case, end 91 is proximate to the second interior facing surface 212, forms the first part 411 and may be substantially thinner than end 92.

In accordance with further aspects of the invention, it is to be understood that the materials and shapes of the first and second tubular members 20 and 30, the temperature and timing of the brazing processes, the type of flux material 42 used and the geometry of the ring material 41 are each interrelated. Therefore, decisions and/or design considerations as to one or more of these affects decisions and/or design considerations of at least one of the others. In particular, the materials and shapes of the first and second tubular members 20 and 30 may be determined initially. Based on that determination, the temperature and timing of the brazing processes may be set. At this point, various types of flux material 42 may be considered and, accordingly, various geometries of the ring material 41 may also be considered as some flux material 42 types may require more or less structural containment as provided by different ring material 41 geometries.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brazing ring, comprising:
   ring material including an aluminum-zinc-silicon alloy having a first melting point; and
   flux material contained within the ring material having a second melting point, which is lower than the first melting point,
   the ring material being formed in an annular shape with a J-shaped cross section having a long inner leg and a short outer leg, which is more exposed to a heat source and closer to a flow target than the long inner leg,
   the flux material being contained within an annular space formed between the legs and exposed outwardly to the heat source in a direction defined along an axial dimension of the ring material, and
   the flux material being more exposed to the heat source than the ring material such that, upon heating, the flux material melts before the ring material.

2. The brazing ring according to claim 1, wherein the molten flux material flows ahead of molten ring material.

3. The brazing ring according to claim 1, wherein the ring material comprises 68-76% aluminum, 16-24% zinc and 4-12% silicon.

4. The brazing ring according to claim 1, wherein the ring material has a weight of between 0.3 and 0.6 grams and the flux material has a weight of between 0.08 and 0.25 grams.

5. The brazing ring according to claim 1, wherein a ratio of ring material to flux material is 70-85% to 15-30%.

6. The brazing ring according to claim 1, wherein the short outer leg and the long inner leg have first and second thicknesses, respectively, the second thickness being thicker than the first thickness.

7. An autobrazing system, comprising:
   first and second tubular members telescopically fittable to define first and second annular spaces; and
   a brazing ring fittable into the second annular space and including ring material including an aluminum-zinc-silicon alloy having a first melting point and flux material having a second melting point, which is lower than the first melting point,
   the ring material being formed in an annular shape with a J-shaped cross section having a long inner leg and a short outer leg, which is more exposed to a heat source and closer to a flow target than the long inner leg,
   the flux material being contained within an annular space formed between the legs and exposed outwardly to the heat source in a direction defined along an axial dimension of the ring material, and
   the flux material being more exposed to the heat source than the ring material such that, upon heating, the flux material melts before the ring material.

8. The autobrazing system according to claim 7, wherein the first and second tubular members each comprise aluminum.

9. The autobrazing system according to claim 7, wherein the molten flux material flows into the first annular space ahead of molten ring material.

10. An autobrazing system, comprising:
    a first aluminum tubular member having a tubular portion and a flared portion at an end thereof;
    a second aluminum tubular member telescopically fittable into the flared and tubular portions to define first and second annular spaces; and
    a brazing ring fittable into the second annular space and including ring material including an aluminum-zinc-silicon alloy having a first melting point and flux material having a second melting point, which is lower than the first melting point,
    the ring material being formed in an annular shape with a J-shaped cross section having a long inner leg and a short outer leg, which is more exposed to a heat source and closer to a flow target than the long inner leg,
    the flux material being contained within an annular space formed between the legs and exposed outwardly to the heat source in a direction defined along an axial dimension of the ring material, and
    the flux material being more exposed to the heat source than the ring material such that, upon heating, the flux material melts before the ring material.

11. The autobrazing system according to claim 10, wherein the molten flux material flows into the first annular space ahead of molten ring material.

* * * * *